US009645777B2

(12) United States Patent
Kikuchi

(10) Patent No.: US 9,645,777 B2
(45) Date of Patent: May 9, 2017

(54) INFORMATION PROCESSING APPARATUS FOR SEARCHING PRINTER, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Hiroshi Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/801,626

(22) Filed: Jul. 16, 2015

(65) Prior Publication Data
US 2016/0026416 A1    Jan. 28, 2016

(30) Foreign Application Priority Data

Jul. 24, 2014    (JP) .................................. 2014-151196

(51) Int. Cl.
G06F 3/12    (2006.01)
(52) U.S. Cl.
CPC .......... G06F 3/1226 (2013.01); G06F 3/1203 (2013.01); G06F 3/1285 (2013.01); G06F 3/1292 (2013.01)

(58) Field of Classification Search
None
See application file for complete search history.

(56) References Cited

U.S. PATENT DOCUMENTS

| | | | | |
|---|---|---|---|---|
| 2003/0200427 A1* | 10/2003 | Kemp | ................... | G06F 9/4411 713/1 |
| 2011/0075203 A1* | 3/2011 | Maekawa | ............. | G06F 3/1205 358/1.15 |
| 2013/0169987 A1* | 7/2013 | Akiyama | ............ | G06F 9/44505 358/1.13 |
| 2015/0062632 A1* | 3/2015 | Torii | ....................... | G06F 3/126 358/1.15 |
| 2015/0350468 A1* | 12/2015 | Kodimer | ............ | H04N 1/00413 358/1.13 |

FOREIGN PATENT DOCUMENTS

JP    H11-345102 A    12/1999

* cited by examiner

Primary Examiner — Miya J Williams
(74) Attorney, Agent, or Firm — Canon U.S.A., Inc., IP Division

(57) ABSTRACT

An information processing apparatus acquires, from a plurality of plug-ins that performs searches for printers, detection results in the searches, and displays, based on the detection results, a selection screen enabling selection of a printer from detected printers. If a printer is determined to have been redundantly detected, the printer is displayed as a single selection candidate on the selection screen.

17 Claims, 11 Drawing Sheets

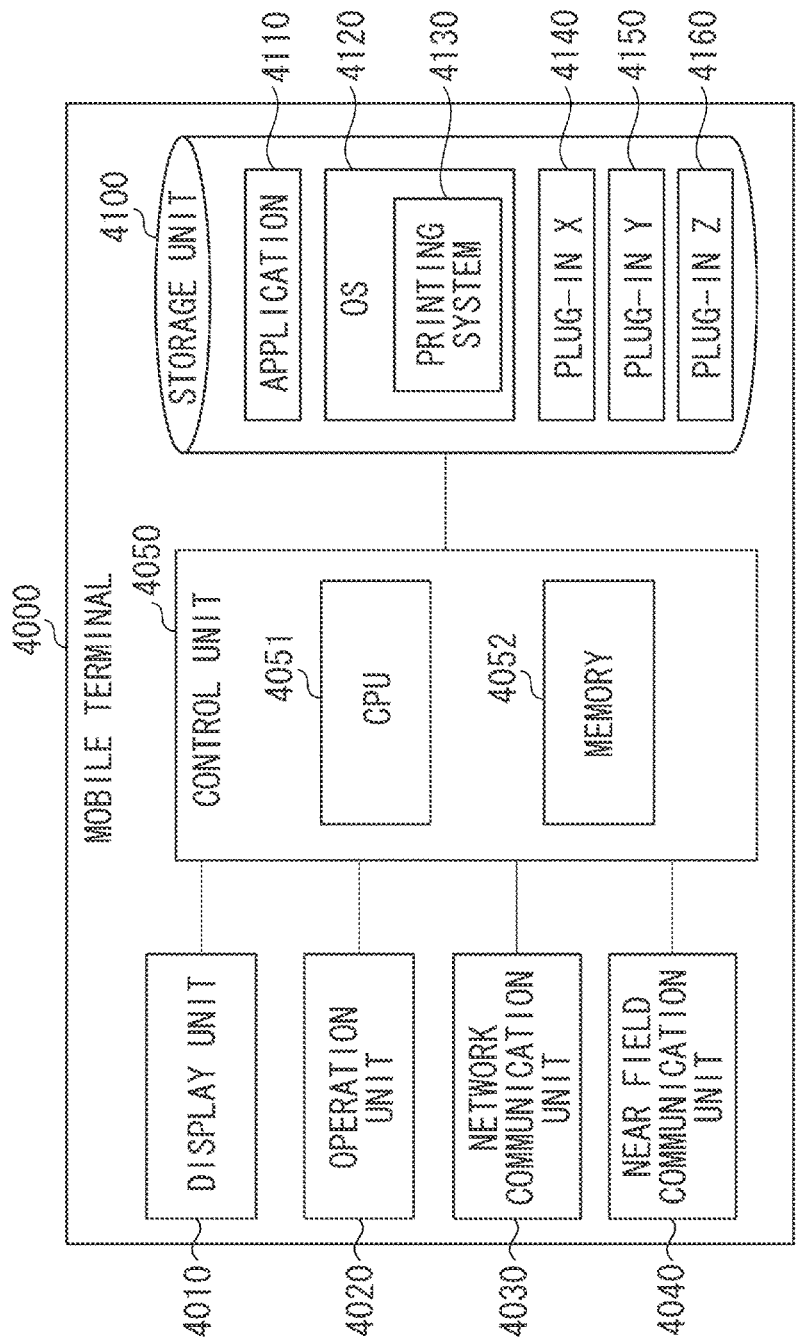

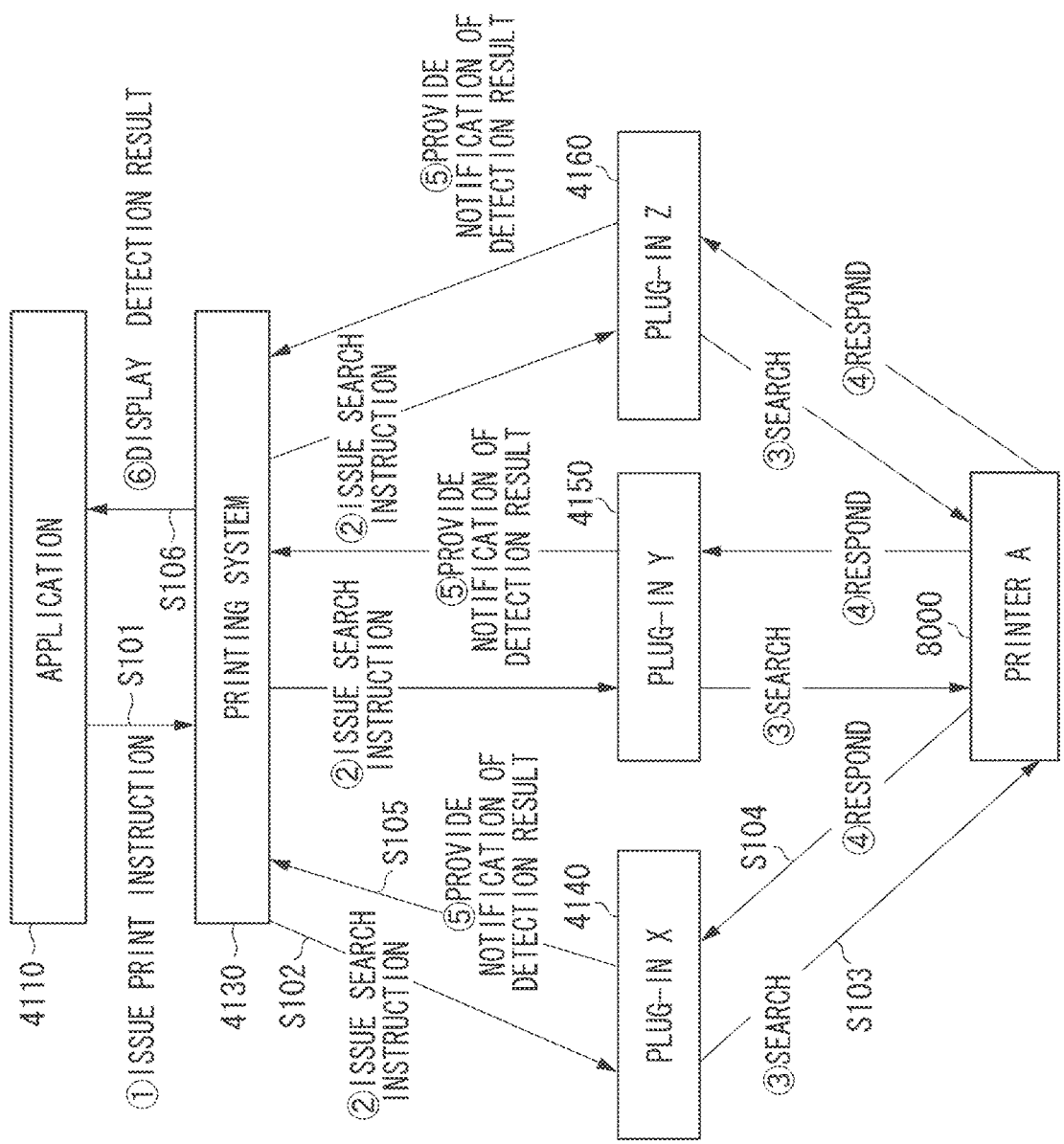

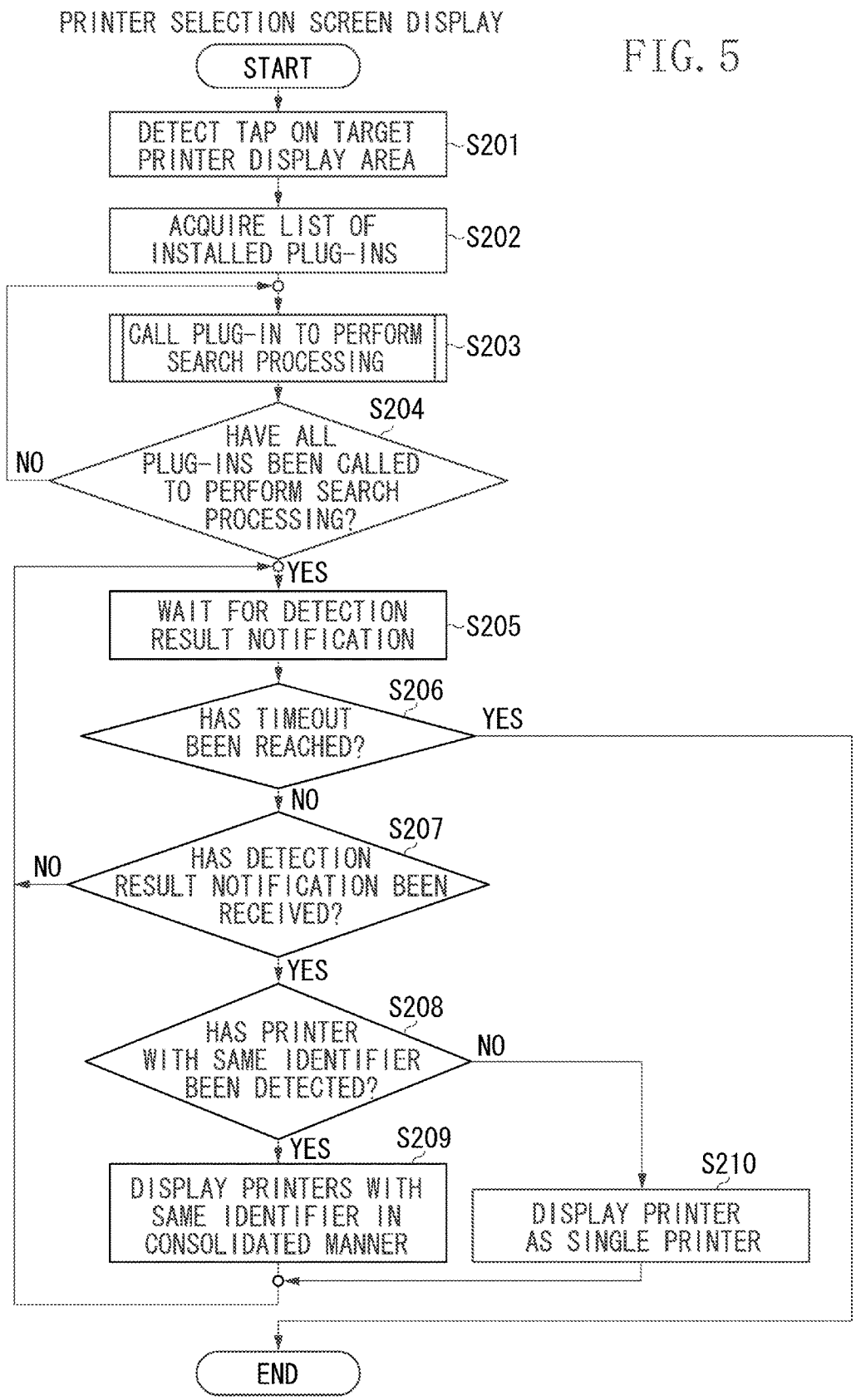

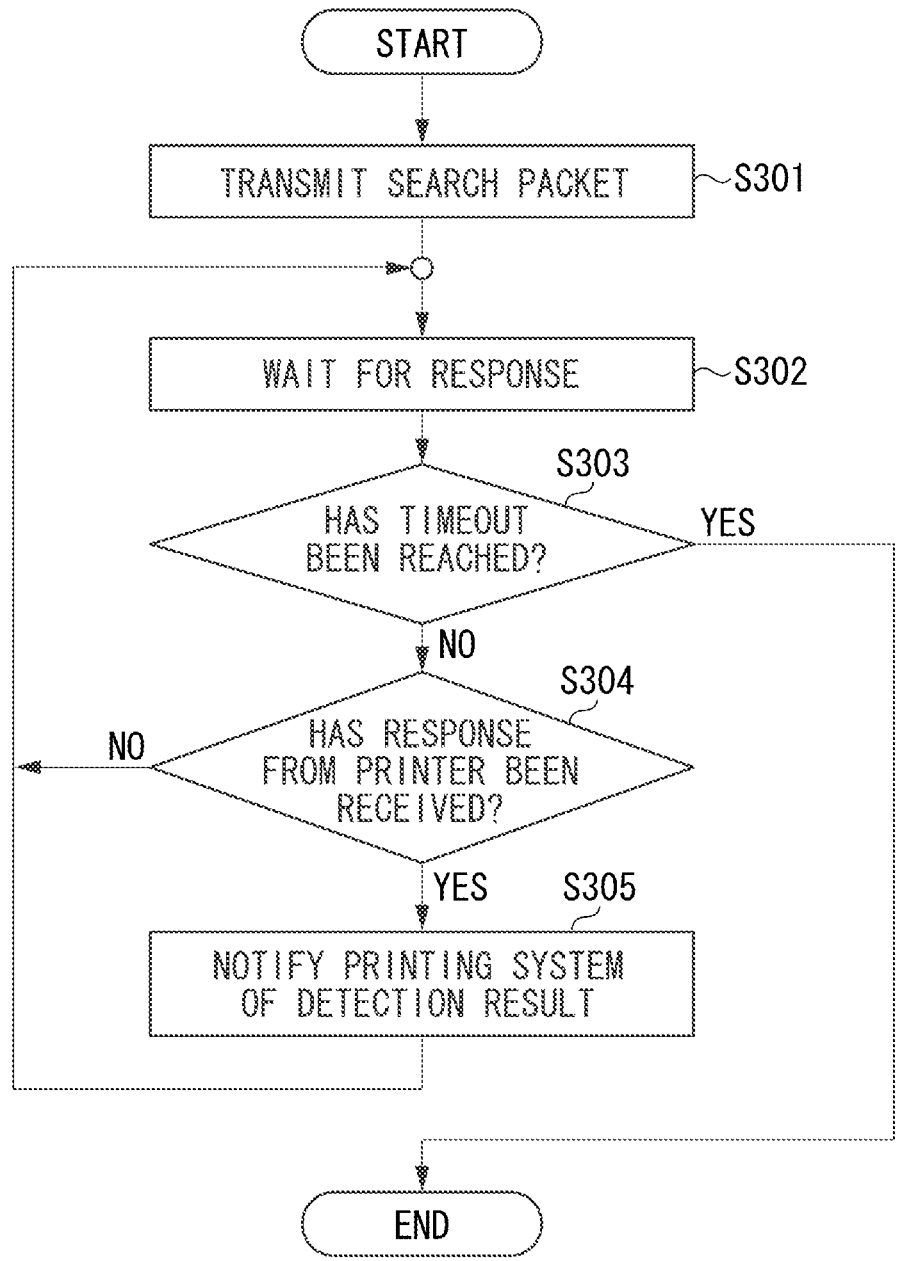

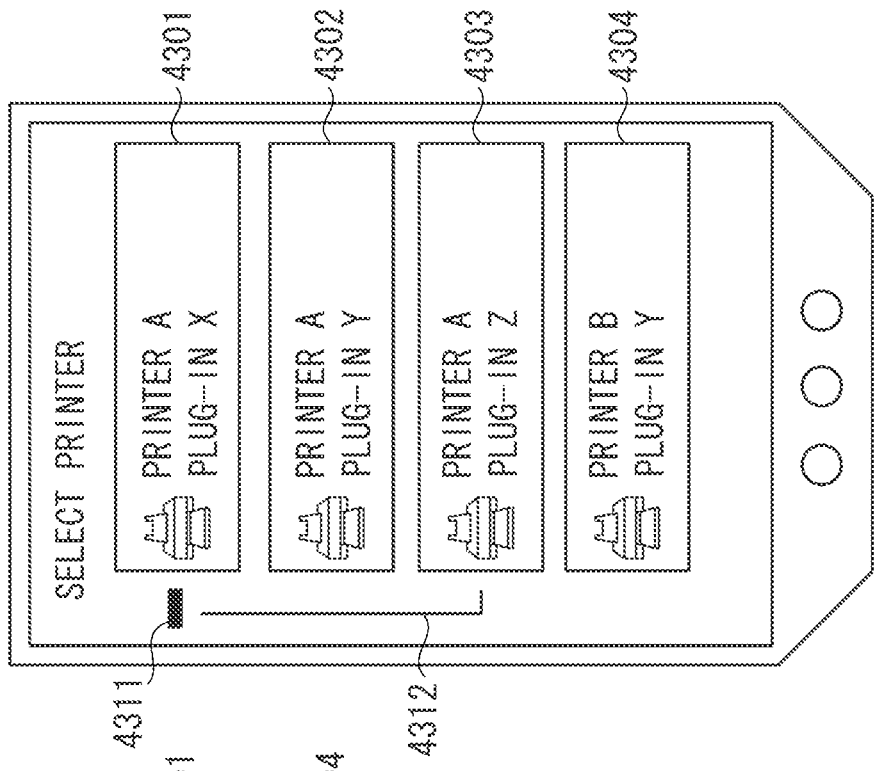
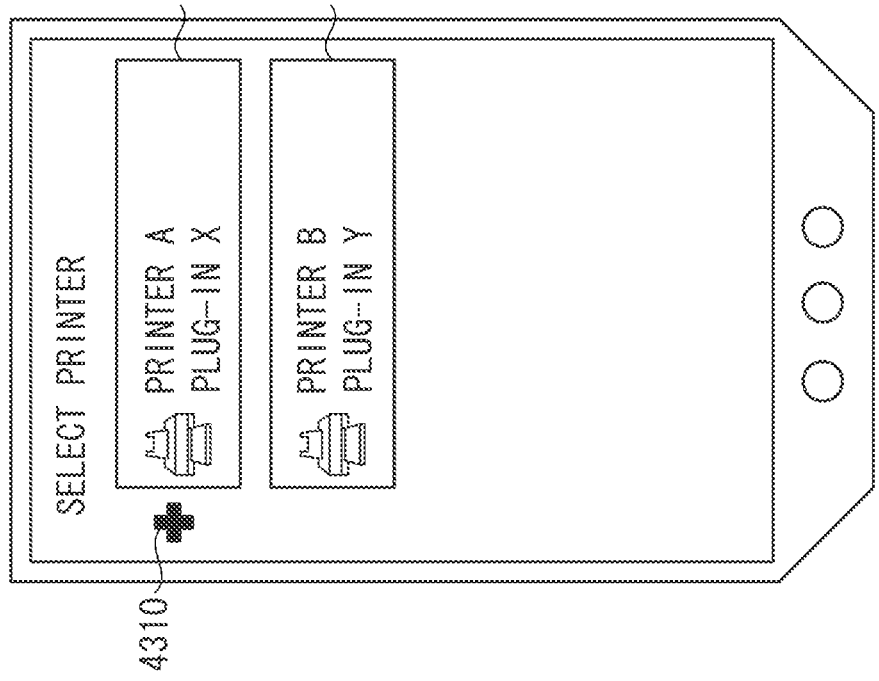

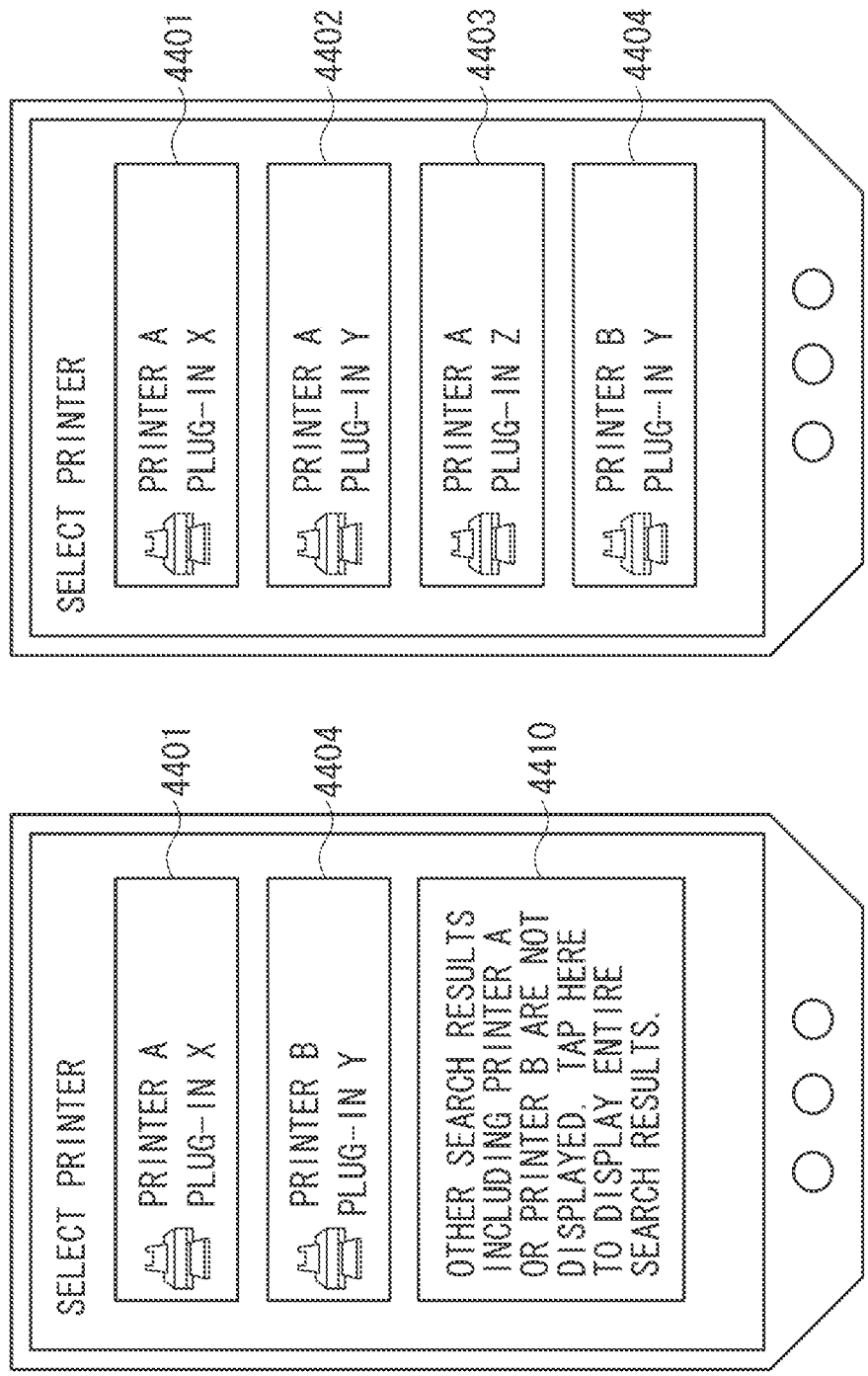

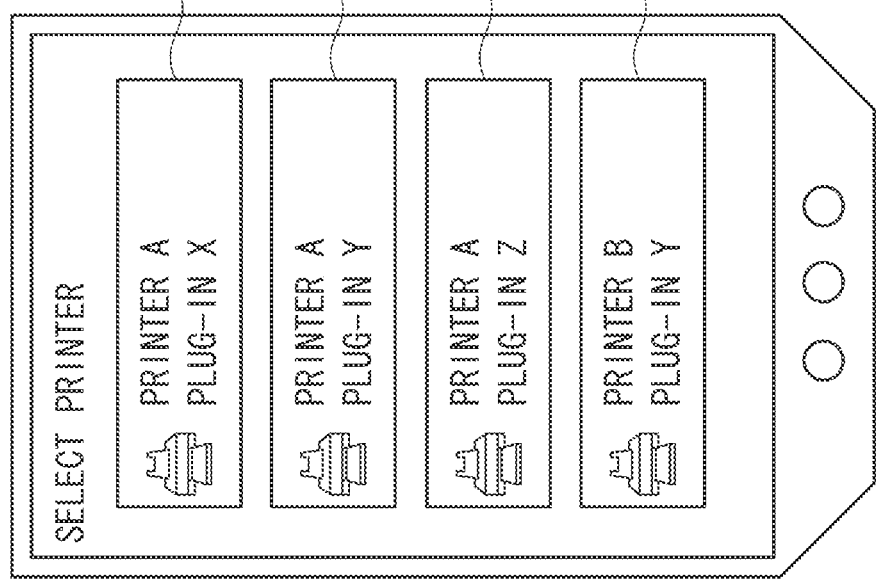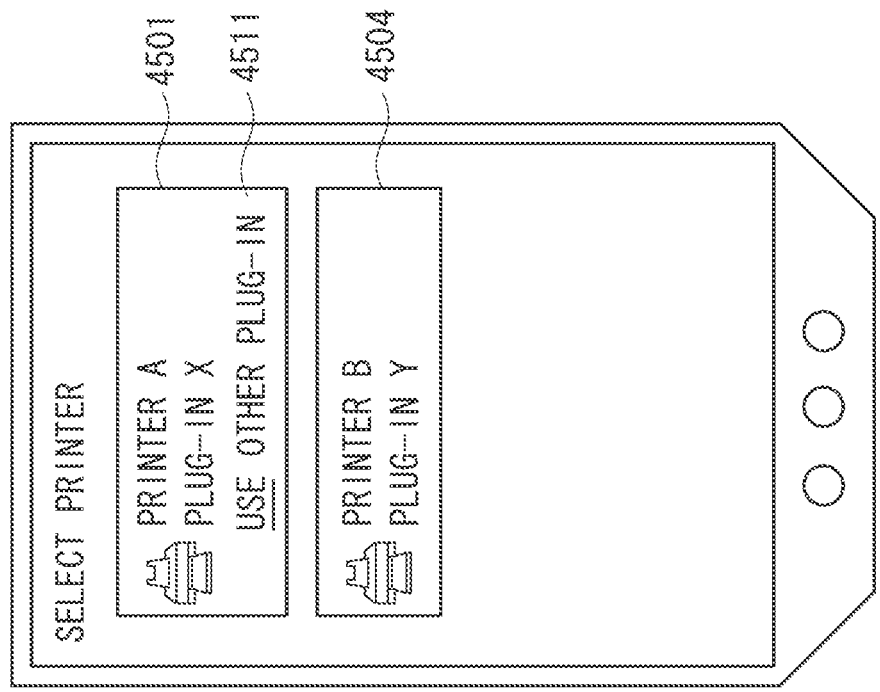

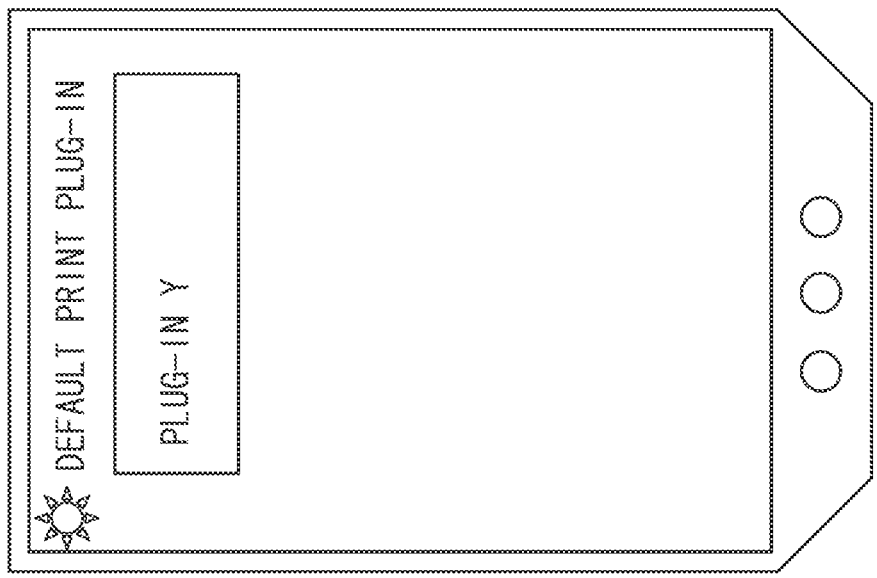
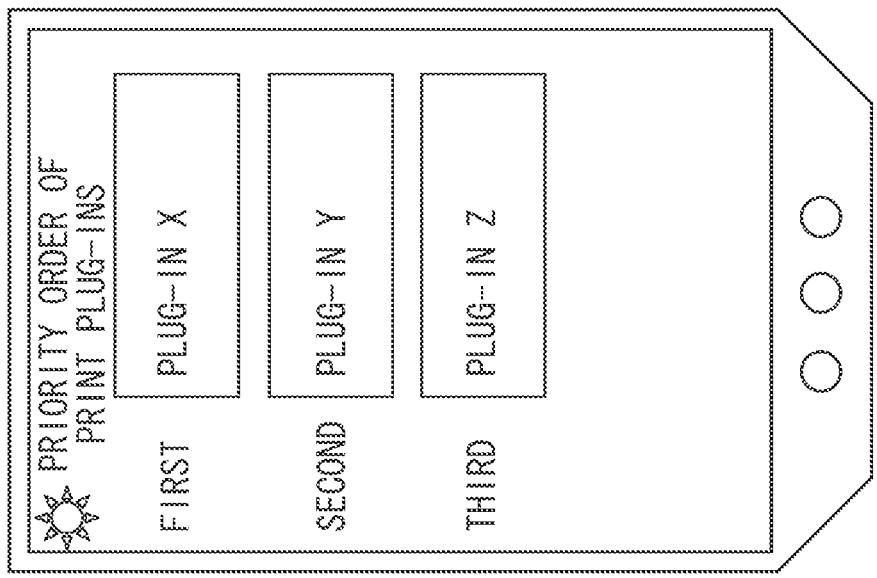

INFORMATION PROCESSING APPARATUS FOR SEARCHING PRINTER, METHOD FOR CONTROLLING INFORMATION PROCESSING APPARATUS, AND STORAGE MEDIUM

BACKGROUND

Field

Aspects of the present invention generally relate to a technique for searching for a printer.

Description of the Related Art

Conventionally, techniques for performing printing using a printer on a network have been discussed.

Japanese Patent Application Laid-Open No. 11-345102 discusses a technique in which printers connected to a network are searched for and data is output to a printer that is found through the search and is currently available.

However, according to Japanese Patent Application Laid-Open No. 11-345102, a single printer driver searches for a printer and data is output to the printer. Typically, the printer model that the printer driver can support is limited to a printer of a single vendor.

SUMMARY

In this specification, a configuration in which a plug-in system is employed is considered, for example, to accommodate a plurality of vendors. With this configuration, a printer can be searched for by using a plurality of plug-ins. However, when this method is used to search for a printer and when there is a printer that can respond to searches by the plurality of plug-ins, the same printer is redundantly included in detection results obtained through the searches by the plurality of plug-ins. As a result, if the detection results that include the same printer are displayed, there arises an issue that the display is confusing to a user and the user cannot make a quick decision to select a printer.

Aspects of the present invention are generally directed to displaying a selection screen where a detection result that includes the same printer as that included in another detection result is excluded from detection results.

According to an aspect of the present invention, an information processing apparatus includes an acquisition unit configured to acquire, from a plurality of plug-ins that performs searches for printers, detection results in the searches, and a display unit configured to display, based on the detection results, a selection screen enabling selection of a printer from detected printers. If the acquisition unit determines that a printer has been redundantly detected, the display unit displays the printer as a single selection candidate on the selection screen.

Further features of the present disclosure will become apparent from the following description of exemplary embodiments with reference to the attached drawings.

BRIEF DESCRIPTION OF THE DRAWINGS

FIGS. 2A, 2B, and 2C each illustrate a configuration of a mobile terminal according to an exemplary embodiment.

FIG. 4 is a general flowchart according to an exemplary embodiment.

FIG. 5 is a detailed flowchart according to an exemplary embodiment.

FIG. 6 is a flowchart of search processing according to an exemplary embodiment.

FIGS. 7A and 7B each illustrate a user interface of a mobile terminal according to a first exemplary embodiment.

FIGS. 8A and 8B each illustrate a user interface of a mobile terminal according to a second exemplary embodiment.

FIGS. 9A and 9B each illustrate a user interface of a mobile terminal according to a third exemplary embodiment.

FIGS. 10A and 10B each illustrate a screen for setting the priority order of plug-ins according to an exemplary embodiment.

DESCRIPTION OF THE EMBODIMENTS

First, a configuration of a printing system according to a first exemplary embodiment will be described.

Figure 1:
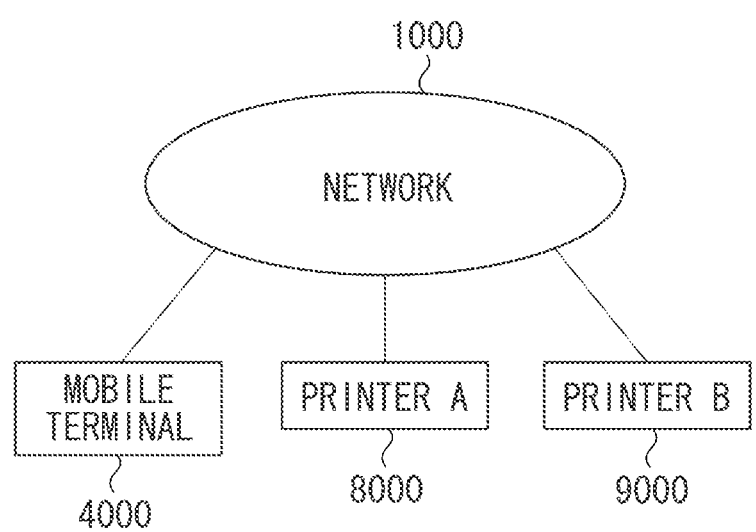
FIG. 1 illustrates an overall configuration of a printing system according to an exemplary embodiment.

FIG. 1 illustrates an example of an overall configuration of the printing system according to the present exemplary embodiment. The printing system includes a mobile terminal 4000 (corresponding to an information processing apparatus), a printer A 8000, and a printer B 9000 that are connected to a network 1000. There are various forms for the network 1000, such as the Internet and an intranet, and any form that allows the mobile terminal 4000, the printer A 8000, and the printer B 9000 to be communicably connected to one another can be employed. Although an example in which the number of printers is two is illustrated in FIG. 1, the number of printers is not limited to two in the present exemplary embodiment.

Subsequently, the configuration of the mobile terminal 4000 according to the present exemplary embodiment will be described with reference to the block diagram illustrated in FIG. 2A. A control unit 4050 that includes a central processing unit (CPU) 4051 and a memory 4052 controls the entire mobile terminal 4000. A display unit 4010 is an output device such as a display, and an operation unit 4020 is an input device having a touch panel, various types of buttons, and so on. A network communication unit 4030 connects to the network 1000 through a 3G network, Wi-Fi, or the like to input/output data to/from an external apparatus. A near field communication unit 4040 communicates with an external apparatus through near field communication (NFC) to input/output data to/from the external apparatus. A storage unit 4100 stores programs, such as various types of applications 4110 and an operating system (OS) 4120. The OS 4120 is software that controls the basic operation of the mobile terminal 4000. The software configuration of the mobile terminal 4000 and the processes in respective steps in the flowcharts described later are implemented by the CPU 4051 loading the programs stored in the storage unit 4100 into the memory 4052 of the control unit 4050 and then executing the programs.

Figure 2C:
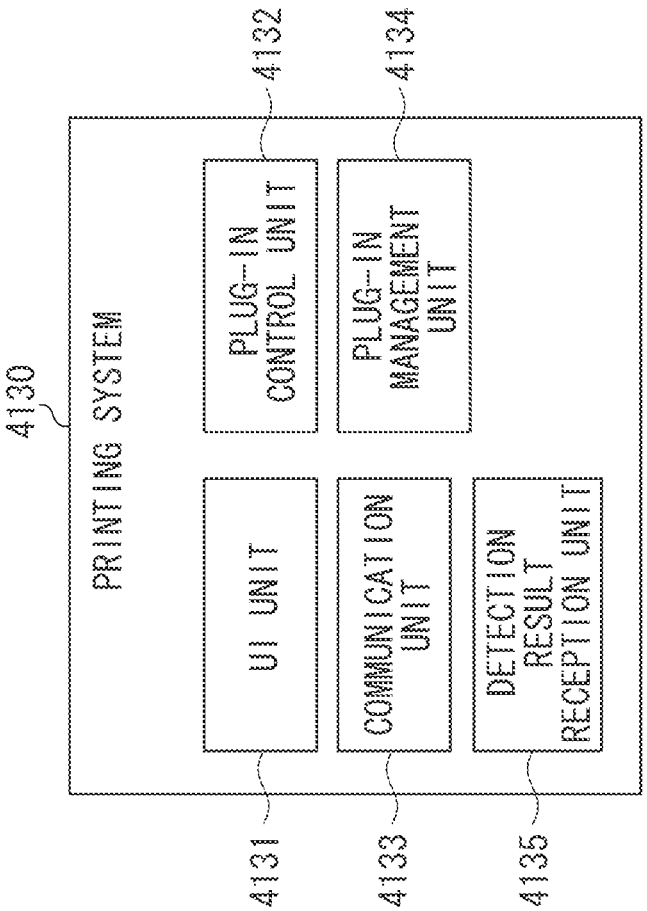

The application 4110 is installed on the mobile terminal 4000 and has functions of displaying and printing content, such as a picture, a document, and a web page, through a printing system 4130. As illustrated in FIG. 2C, the printing system 4130 includes a user interface (UI) unit 4131, a plug-in control unit 4132, a communication unit 4133, a plug-in management unit 4134, and a detection result reception unit 4135. The UI unit 4131 displays a user interface in the printing system 4130. The plug-in control unit 4132 controls the operation of a plug-in installed on the mobile terminal 4000. The communication unit 4133 performs network communication with a printer by using the network communication unit 4030 (e.g., Wi-Fi). The plug-in management unit 4134 manages information of a plug-in installed on the mobile terminal 4000. The detection result reception unit 4135 receives a notification of a result on a printer detected on the network by a plug-in. A plug-in X 4140, a plug-in Y 4150, and a plug-in Z 4160 each have functions of searching for a printer, generating a print job, acquiring a printer status, and so on, and transmit information between the printing system 4130 and a target printer. The plug-ins can separately be installed or uninstalled as necessary, and the plug-in management unit 4134 manages the installation state of the plug-ins.

Figure 2B:
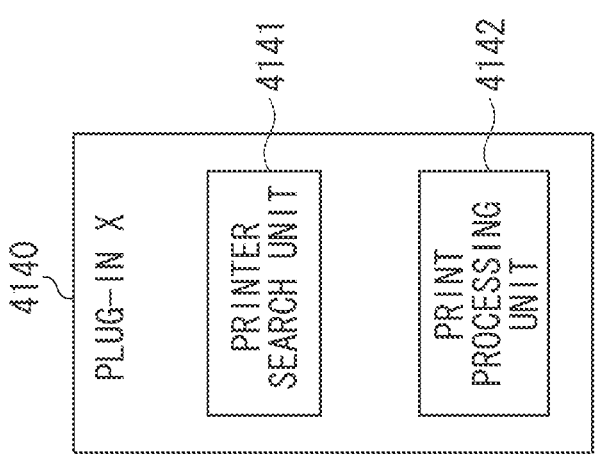

Now, the plug-ins will be described with reference to FIG. 2B which takes the plug-in X 4140 as an example. A printer search unit 4141 searches for a printer on the network 1000 by using multicast or broadcast. A service location protocol (SLP) or multicast-domain name system (DNS) is used as a protocol, but the protocol is not limited thereto, and different protocols may be used for different plug-ins. A print processing unit 4142 renders data into a page description language (PDL) or an image that can be printed by the printer A 8000 or the printer B 9000.

Figure 3A:
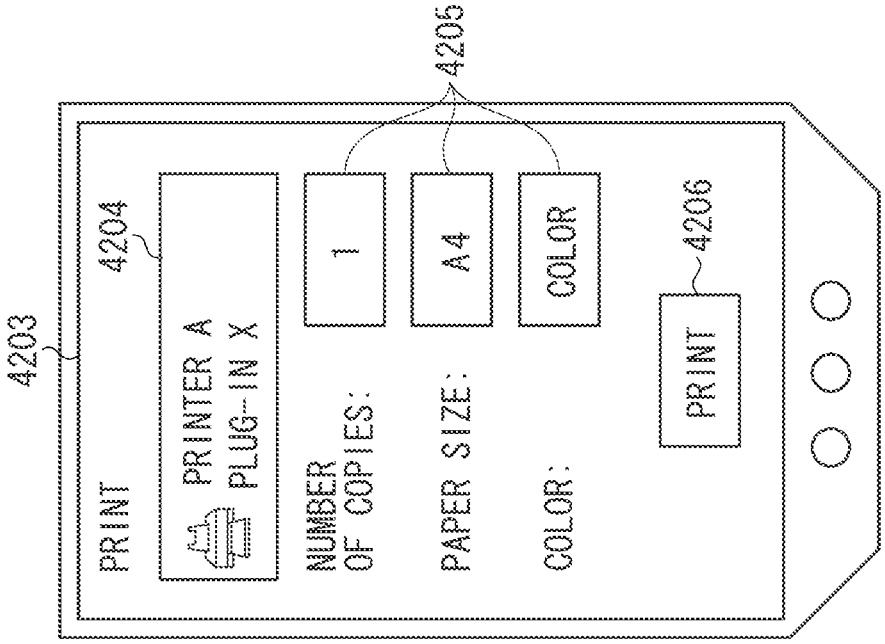
FIGS. 3A and 3B each illustrate a user interface of a mobile terminal according to an exemplary embodiment.
Figure 3B:
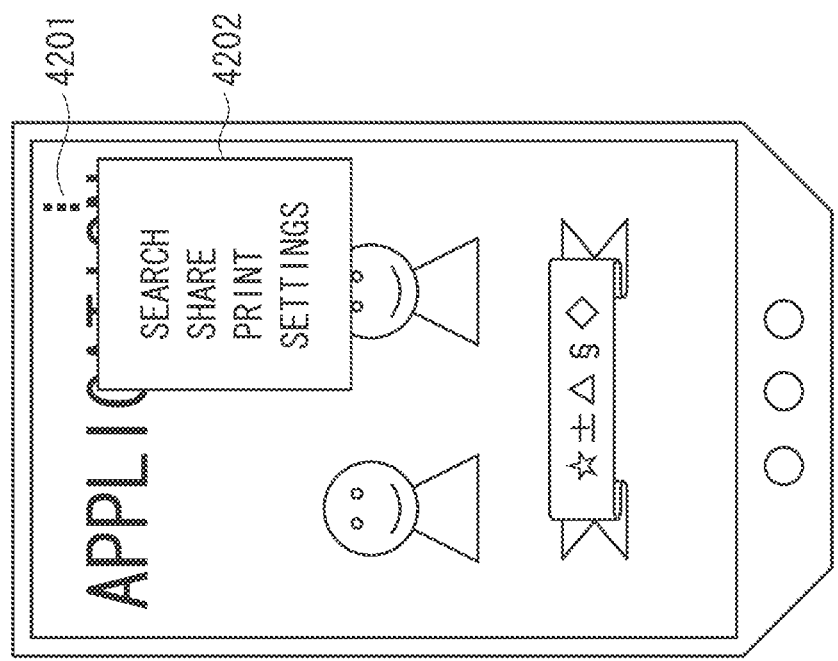

FIGS. 3A and 3B each illustrate an example of a screen of the application 4110 implementing the functionality of the printing system 4130. When a setting button 4201 is pressed on the screen of the application 4110 that displays the content to be printed, a context menu 4202 is displayed. When a user taps "Print" in the context menu 4202, the UI unit 4131 of the printing system 4130 is called, and a print setting screen 4203 is displayed.

The print setting screen 4203 includes a target printer display area 4204, a print setting area 4205, and a print button 4206. When the user confirms the desired print settings in the print setting area 4205 and then taps the print button 4206, the content data of the application 4110 can be printed by the printer displayed in the target printer display area 4204. In the example of FIG. 3B, the printer A 8000 using the plug-in X 4140 is selected. When the output destination is to be changed to another printer, the user taps the target printer display area 4204. Through this operation, a printer selection screen as illustrated in FIG. 7A is displayed. Hereinafter, an operation from when the target printer display area 4204 is tapped until when the printer selection screen is displayed will be described.

FIG. 4 is a flowchart illustrating an overview of the operation according to the present exemplary embodiment. Here, an example in which data is output from the application 4110 to the printer A 8000 will be described. In step S101, the application 4110 issues a print instruction, and in step S102, the printing system 4130 issues a search instruction to all the plug-ins X 4140, Y 4150, and Z 4160 installed on the mobile terminal 4000. The process in step S102 is performed when the target printer display area 4204 is tapped on the print setting screen 4203. In step S103, each of the plug-ins X 4140, Y 4150, and Z 4160 searches for a printer on the network 1000. In step S104, in response to a search by each of the plug-in X 4140, the plug-in Y 4150, and the plug-in Z 4160, the printer A 8000 returns a response indicating that the printer A 8000 is available for printing. In step S105, each of the plug-ins X 4140, Y 4150, and Z 4160 that has received the response from the printer A 8000 notifies the printing system 4130 of the information of the printer A 8000 as a detection result. In step S106, based on the detection result received from each of the plug-ins X 4140, Y 4150, and Z 4160, the printing system 4130 displays a UI such as the printer selection screen illustrated in FIG. 7A on the display unit 4010.

FIG. 5 is a flowchart illustrating an example of a detailed operation of the printing system 4130 from when the target printer display area 4204 is tapped on the print setting screen 4203 until when the printer selection screen is displayed. The processing described in the present exemplary embodiment is implemented by the CPU 4051 loading a program stored in the storage unit 4100 into the memory 4052 and then executing the program. In step S201, the target printer display area 4204 is tapped on the print setting screen 4203. In step S202, the plug-in control unit 4132 acquires a list of plug-ins installed on the mobile terminal 4000 through the plug-in management unit 4134. In step S203, the plug-in control unit 4132 calls search processing performed by the installed plug-ins.

FIG. 6 is a flowchart of the search processing performed by the plug-in X 4140. In the present exemplary embodiment, the processing in FIG. 5 and the processing in FIG. 6 are asynchronously performed. After the plug-in control unit 4132 calls the search processing performed by the plug-in X 4140, in step S301, the printer search unit 4141 transmits a printer search packet using broadcast. After transmitting the search packet, in step S302, the printer search unit 4141 enters a state of waiting for a response. In step S303, it is determined whether the printer search unit 4141 has reached a timeout. If the timeout is determined to have not been reached (NO in step S303), in step S304, it is determined whether a response has been received from a printer. If a response is determined to have been received from a printer (YES in step S304), the processing proceeds to step S305. In step S305, the printer search unit 4141 notifies the printing system 4130 of the detection result, and the processing then returns to step S302. Here, the detection result of which the printing system 4130 is notified includes the identifier of the detected printer. The identifier of the printer allows a physical printer to be uniquely identified and is, for example, the Internet protocol (IP) address of the printer. The processes in steps S302 through S305 are continued until the timeout is determined to have been reached in step S303. When the timeout is determined to have been reached in step S303, the search processing by the plug-in X 4140 is terminated.

Although the IP address is taken as an example of the identifier of the printer, the identifier is not limited to the IP address. Aside from the IP address, the serial number, the MAC address, or the universal unique ID (UUID) of the printer may be used as the identifier of the printer. Also in a case where a target printer is present on a cloud, detected printers with the same identifier are displayed in a consolidated manner. Furthermore, even when a different connection form is used between the mobile terminal 4000 and printers, such as IPv4, IPv6, Bluetooth (registered trademark), or Wi-Fi Direct, detected printers with the same identifier are displayed in a consolidated manner, so that the usability can be ensured in the present exemplary embodiment. In a multifunction peripheral, plug-ins for different purposes, such as for printing and for faxing, are also present. If search results are obtained by plug-ins for different purposes, and include printers with the same identifier, the printers may be displayed separately.

Returning to the processing in the flowchart illustrated in FIG. 5, processes in step S204 and thereafter will be described. In step S204, the plug-in control unit 4132 determines whether all the plug-ins have been called to perform the search processing. If all the plug-ins have been called to perform the search processing (YES in step S204), then in step S205, the detection result reception unit 4135 enters a state of waiting for a detection result notification from a plug-in.

In step S206, it is determined whether the detection result reception unit 4135 has reached a timeout. If the timeout is determined to have not been reached (NO in step S206), in step S207, it is determined whether the detection result reception unit 4135 has received a detection result notification from a plug-in. More specifically, if the detection result reception unit 4135 has received the result transmitted by the plug-in in the process of step S305 of the flowchart illustrated in FIG. 6, the detection result is determined to have been received from the plug-in.

If the detection result reception unit 4135 has received a detection result notification (YES in step S207), in step S208, by referring to the identifier of the printer included in the detection result acquired from the plug-in, it is determined whether a printer with the same identifier has already been detected. Through this process, it is determined whether the printer has been redundantly detected based on the detection result. If a printer with the same identifier has not yet been detected (NO in step S208), then in step S210, the printer currently detected is displayed on the UI unit 4131 as a single printer. On the other hand, if a printer with the same identifier has already been detected (YES in step S208), in step S209, the printers with the same identifier are displayed in a consolidated manner on the UI unit 4131. A method for the consolidated display will be described later with reference to FIGS. 7A, 7B, and so on. The printing system 4130 continues the processes in steps S205 through S210 until the timeout is determined to have been reached in step S206. The display processing of the printer selection screen is then terminated.

Subsequently, a method in which the printing system 4130 displays detected printers with the same identifier in a consolidated manner on the UI unit 4131 will be described with several illustrative examples.

FIGS. 7A and 7B illustrate an appearance of the printer selection screen according to the first exemplary embodiment.

In the present exemplary embodiment, as illustrated in FIG. 4, all of the plug-in X 4140, the plug-in Y 4150, and the plug-in Z 4160 allow printing on the printer A 8000. Even in such a case, on the screen illustrated in FIG. 7A, the printer A 8000 is displayed in a consolidated manner only with an option button 4301. This is a result obtained when the printing system 4130 displays the printers with the same identifier in a consolidated manner in step S209 of FIG. 5. Displaying the printers in a consolidated manner means that the printer selection screen is displayed in such a manner that when a printer is redundantly detected by a plurality of plug-ins, one of the plug-ins is specified according to the priority order or the default setting, which will be described later, and any plug-in other than the specified plug-in is excluded. In the example illustrated in FIG. 7A, for the printer A 8000 that is redundantly included in detection results, the printer selection screen is displayed in such a manner that the detection results by the plug-in Y 4150 and the plug-in Z 4160 other than that by the plug-in X 4140 are excluded. This configuration allows, for the printer A 8000, only the detection result by the plug-in X 4140 to be displayed as a single selection candidate on the printer selection screen.

On the other hand, the plug-in that allows printing on the printer B 9000 is the plug-in Y 4150 only. Therefore, only an option button 4304 is displayed alone to display the printer B 9000. This is a result obtained when the printing system 4130 displays a detected printer as a single printer in step S210 of FIG. 5. A plus mark 4310 (+), which will be described later, is not displayed on the left side of the option button 4304. Since the plus mark 4310 is not displayed on the left side of the option button 4304, the user can recognize that the plug-in Y 4150 is the only plug-in that allows printing on the printer B 9000, unlike the case of the printer A 8000.

If the printing system 4130 displays all the detection results received by the detection result reception unit 4135 on the UI unit 4131 in a uniform manner, the printer selection screen is displayed as illustrated in FIG. 8B. The physically identical printer A 8000 is displayed for each of the plug-ins in a duplicated manner, as illustrated in detection results 4401, 4402, and 4403, and the usability thus suffers. As illustrated in FIG. 1, only two printers, namely, the printer A 8000 and the printer B 9000 are connected on the network 1000 according to the present exemplary embodiment. Despite this, a total of four printers are displayed on the printer selection screen.

On the contrary, the usability can be improved by displaying the printer selection screen illustrated in FIGS. 7A and 7B when a printer is to be selected. More specifically, in the example illustrated in FIG. 7A, a plurality of detection results including the printer A 8000 is consolidated into the detection result by the plug-in X 4140, and the printer A 8000 using the plug-in X 4140 is selected when the user taps the option button 4301. Thus, the output destination of the application 4110 is set to the printer A 8000 using the plug-in X 4140, and the display returns to the screen illustrated in FIG. 3B. In the target printer display area 4204 of the print setting screen 4203 illustrated in FIG. 3B, the printer A 8000 using the plug-in X 4140 is displayed. In other words, with the display such as the one illustrated in FIG. 7A, the number of options on the printer selection screen is reduced, allowing the user to select a printer with ease.

Now, referring back to the printer selection screen illustrated in FIG. 7A, a method for canceling the consolidated display will be described. In the present exemplary embodiment, the plus mark 4310 is displayed on the left side of the name of the printer that is displayed in a consolidated manner on the printer selection screen. The plus mark 4310 functions as a reception unit that receives an instruction for displaying, together with the specified plug-in described above, the plug-ins other than the specified plug-in that have been excluded from the printer selection screen illustrated in FIG. 7A.

More specifically, when the user taps the plus mark 4310, the printing system 4130 changes the plus mark 4310 to a minus mark 4311 (−), as illustrated in FIG. 7B and, at the same time, cancels the consolidated display of printers with the same identifier. Then, on the screen illustrated in FIG. 7B, in addition to the option button 4301, option buttons 4302 and 4303 are displayed indicating that the plug-in Y 4150 and the plug-in Z 4160 are also available as the plug-ins that allow printing on the printer A 8000. In addition, on the screen illustrated in FIG. 7B, a line 4312 is provided below the minus mark 4311 so that the user can recognize that, in addition to the plug-in X 4140, the plug-in Y 4150 and the plug-in Z 4160 allow printing on the printer A 8000.

As described above, on the printer selection screen illustrated in FIG. 7A, the plus mark 4310 is displayed only for the printer displayed in a consolidated manner. With this configuration, on the printer selection screen illustrated in FIG. 7A, the printer displayed in a consolidated manner through the process in step S209 of FIG. 5 and the printer displayed alone through the process in step S210 are displayed so that they can be discriminated from each other.

When the user taps the option button 4303 on the screen illustrated in FIG. 7B, the printing system 4130 returns to the screen illustrated in FIG. 3B, and displays the printer A 8000 using the plug-in Z 4160 in the target printer display area 4204. When the minus mark 4311 is tapped on the screen illustrated in FIG. 7B, the display returns to the screen illustrated in FIG. 7A.

According to the present exemplary embodiment, even when a single printer is redundantly detected by a plurality of plug-ins, the printer can be displayed as a single selection candidate on a selection screen.

FIGS. 8A and 8B illustrate an appearance of a printer selection screen according to a second exemplary embodiment. As in the first exemplary embodiment, the printing system 4130 displays detected printers with the same identifier in a consolidated manner, and thus an option button 4401 that indicates the printer A 8000 using the plug-in X 4140 and an option button 4404 that indicates the printer B 9000 using the plug-in Y 4150 are displayed on the printer selection screen. Furthermore, in the present exemplary embodiment, a cancel button 4410 is displayed with a message saying "Other search results including printer A or printer B are not displayed. Tap here to display entire search results". The cancel button 4410 is used to cancel the consolidated display, and when the user taps the cancel button 4410, the screen illustrated in FIG. 8B is displayed. More specifically, the option button 4401 that indicates the printer A 8000 using the plug-in X 4140 is expanded into three option buttons, namely, 4401 through 4403. The cancel button 4410 is not displayed on the screen obtained after the consolidated display has been canceled. In the present exemplary embodiment, when the user taps, for example, the option button 4403, the printing system 4130 returns to the screen illustrated in FIG. 3B, similarly to the first exemplary embodiment. At that time, the printer A 8000 using the plug-in Z 4160 is displayed in the target printer display area 4204.

FIGS. 9A and 9B illustrate an appearance of a printer selection screen according to a third exemplary embodiment. In the present exemplary embodiment, similarly to the exemplary embodiments described above, the printing system 4130 displays detected printers with the same identifier in a consolidated manner. Thus, an option button 4501 that indicates the printer A 8000 using the plug-in X 4140 and an option button 4504 that indicates the printer B 9000 using the plug-in Y 4150 are displayed on the printer selection screen. Furthermore, in the present exemplary embodiment, a character string 4511 saying "Use other plug-in" is displayed within the display area of the option button 4501. The character string 4511 provides a link for canceling the consolidated display, and when the user taps the character string 4511, the screen illustrated in FIG. 9B is displayed. More specifically, the option button 4501 that indicates the printer A 8000 using the plug-in X 4140 is expanded into three buttons, namely, 4501 through 4503. The character string 4511 for canceling the consolidated display is not displayed on the screen obtained after the consolidated display has been canceled. In the present exemplary embodiment, the operation to be performed when the user taps, for example, the option button 4503 is similar to that in the exemplary embodiments described above.

Thus far, the consolidated display of printers has been described using the first through third exemplary embodiments. When detected printers with the same identifier are displayed in a consolidated manner in step S209, there is an issue as to which one of the plug-ins should be specified for the consolidated display. Here, a method for setting the priority order of all the plug-ins installed on the mobile terminal 4000 will be described. The plug-in management unit 4134 sets the priority order of all the installed plug-ins. The priority order can be changed by the user, and the UI unit 4131 displays a setting screen for changing the priority order.

FIG. 10A illustrates a screen for changing the setting of the priority order. The screen illustrated in FIG. 10A can be opened from the setting screen included in the OS 4120 of the mobile terminal 4000, and indicates that a plug-in displayed closer to the top of the screen has a higher priority order. To change the current priority order, the user taps a plug-in displayed on the screen illustrated in FIG. 10A and drags the plug-in to a desired location. Thus, the user can move up (down) the desired plug-in to give it a higher (lower) priority.

Based on the priority order set by the user, the plug-in management unit 4134 determines which one of the plug-ins is to be specified when consolidating detected printers with the same identifier in step S209 of FIG. 5. Thus, when the plug-in X 4140 is given the first priority as illustrated in FIG. 10A, the printers are consolidated with the plug-in X 4140 in step S209. In addition, the order from the second priority and below is reflected on the order of arrangement when the consolidation display is canceled, as illustrated in FIG. 7B and so on.

When a new plug-in is to be installed, the plug-in management unit 4134 may register the new plug-in as a plug-in having the highest priority order. With this configuration, even when a plurality of printers with the same identifier is found through searches, the printers can be displayed so as to be consolidated into the printer using the plug-in that has been installed most recently.

Furthermore, the configuration may be such that only a single default plug-in is set, as illustrated in FIG. 10B. The behavior of the printer selection screen when a single default plug-in is set is the same as the behavior thereof when a plug-in having the highest priority order is set as illustrated in FIG. 10A.

The priority order of all the plug-ins installed on the mobile terminal 4000 are also effective in the case of printing through a touch-to-print feature. In the touch-to-print feature, an NFC tag that stores the IP address in advance is affixed to the printer. When the NFC tag is touched with the mobile terminal 4000, the near field communication unit 4040 of the mobile terminal 4000 detects the NFC tag and acquires the IP address of the printer from the NFC tag. The printing system 4130 acquires an event of the touch-to-print via the OS 4120. Then, the printing system 4130 requests each of the installed plug-ins to search for the printer based on the acquired IP address. If the printing system 4130 receives detection result notifications from the plurality of plug-ins, the printing system 4130 refers to the priority order described above and instructs the plug-in having the highest priority order to perform printing. With this configuration, at the time of touch-to-print, printing can be performed by using the plug-in having the highest priority order without displaying the UI.

The exemplary embodiments can also be implemented through a process in which a program that implements one or more of the functions of the exemplary embodiments described above is supplied to a system or an apparatus via a network or in the form of a storage medium and at least one processor in a computer of the system or the apparatus reads out and executes the program. In addition, the exemplary embodiments can be implemented by a circuit (e.g., application specific integrated circuit (ASIC)) that implements one or more of the functions.

According to the exemplary embodiments, when a single printer is redundantly detected, the printer is displayed as a single selection candidate on a selection screen, so that the selection screen that is user-friendly and allows the user to easily select a printer can be provided.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-151196, filed Jul. 24, 2014, which is hereby incorporated by reference herein in its entirety.

What is claimed is:

1. An information processing apparatus comprising:
wherein the information processing apparatus includes at least a processor and at least a memory coupled to the at least a processor and having stored thereon instructions which, when executed by the at least the processor, cause the at least the processor to function as:
an acquisition unit configured to acquire, from a plurality of plug-ins that perform searches for printers on a network, detection results in the searches; and
a display unit configured to display, based on the detection results, a selection screen enabling selection of a printer from detected printers,
wherein if one printer has been redundantly detected by the plurality of plug-ins, the display unit displays the one printer as a single selection candidate on the selection screen and enables display for recognizing at least one plug-in among the plurality of plug-ins having detected the one printed to be performed,
wherein, if the one printer has been redundantly detected by the plurality of plug-ins, one of the plurality of plug-ins for the one printer redundantly detected is specified, and the display unit displays the one printer as a single selection candidate on the selection screen where the specified plug-in is included and a plug-in other than the specified plug-in is excluded.

2. The information processing apparatus according to claim 1, further comprising a reception unit configured to receive an instruction for displaying, on the selection screen, a printer detected by the plug-in other than the specified plug-in,
wherein, if the reception unit receives the instruction, the printer detected by the plug-in other than the specified plug-in and the printer detected by the specified plug-in are displayed on the selection screen.

3. The information processing apparatus according to claim 1, wherein, if a specific printer has been detected by only one of the plurality of plug-ins, the display unit displays the specific printer on the selection screen so as to be discriminable from the printer that has been redundantly detected.

4. The information processing apparatus according to claim 1, wherein each of the detection results includes an identifier of a detected printer, and
wherein the acquisition unit determines, based on the identifier of the detected printer, whether a printer has been redundantly detected.

5. The information processing apparatus according to claim 1, further comprising a calling unit configured to call search processing of printers performed by the plurality of plug-ins,
wherein the detection results are results detected through the search processing of printers performed by the plurality of plug-ins.

6. The information processing apparatus according to claim 1, further comprising a setting unit configured to set the printer selected on the selection screen as an output destination of an application.

7. The information processing apparatus according to claim 1, wherein the display unit displays a name of the one printer as the single selection candidate and a name of the specified plug-in.

8. The information processing apparatus according to claim 1, wherein the display unit further displays an object for displaying the excluded plug-in other than the specified plug-in, and
wherein the display unit displays the specified plug-in and the excluded plug-in in a case where the object receives an instruction.

9. A method for controlling an information processing apparatus, the method comprising:
acquiring, from a plurality of plug-ins that perform searches for printers on a network, detection results in the searches; and
displaying, based on the detection results, a selection screen enabling selection of a printer from detected printers,
wherein if one printer has been redundantly detected by the plurality of plug-ins, the one printer is displayed as a single selection candidate on the selection screen and enables display for recognizing at least one plug-in among the plurality of plug-ins having detected the one printer to be performed,
wherein, if the one printer has been redundantly detected by the plurality of plug-ins, one of the plurality of plug-ins is specified for the one printer redundantly detected, and displaying the one printer as a single selection candidate on the selection screen where the specified plug-in is included and a plug-in other than the specified plug-in is excluded.

10. The method according to claim 9, further comprising receiving an instruction for displaying, on the selection screen, a printer detected by the plug-in other than the specified plug-in,
wherein, if the instruction has been received, the printer detected by the plug-in other than the specified plug-in and the printer detected by the specified plug-in are displayed on the selection screen.

11. The method according to claim 9, wherein, if a specific printer has been detected by only one of the plurality of plug-ins, the specific printer is displayed on the selection screen so as to be discriminable from the printer that has been redundantly detected.

12. The method according to claim 9, wherein each of the detection results includes an identifier of a detected printer, and
wherein it is determined, based on the identifier of the detected printer, whether a printer has been redundantly detected.

13. The method according to claim 9, further comprising calling search processing of printers performed by the plurality of plug-ins,
wherein the detection results are results detected through the search processing of printers performed by the plurality of plug-ins.

14. The method according to claim 9, further comprising setting the printer selected on the selection screen as an output destination of an application.

15. The method according to claim 9, displaying a name of the one printer as the single selection candidate and a name of the specified plug-in.

16. The method according to claim 9, wherein further displaying an object for the excluded plug-in other than the specified plug-in, and
wherein displaying the specified plug-in and the excluded plug-in in a case where the object receives an instruction.

17. A non-transitory computer-readable storage medium storing computer executable instructions that cause a computer to execute a method for controlling an information processing apparatus, the method comprising:
acquiring, from a plurality of plug-ins that perform searches for printers on a network, detection results in the searches; and
displaying, based on the detection results, a selection screen enabling selection of a printer from detected printers,
wherein if one printer has been redundantly detected by the plurality of plug-ins, the one printer is displayed as a single selection candidate on the selection screen and enables display for recognizing at least one plug-in among the plurality of plug-ins having detected the one printer to be performed,
wherein, if the one printer has been redundantly detected by the plurality of plug-ins, one of the plurality of plug-ins is specified for the one printer redundantly detected, and displaying the one printer as a single selection candidate on the selection screen where the specified plug-in is included and a plug-in other than the specified plug-in is excluded.

* * * * *